(12) United States Patent
Weisman et al.

(10) Patent No.: US 8,711,985 B2
(45) Date of Patent: Apr. 29, 2014

(54) MULTI USER MIMO DETECTION UTILIZING AVERAGED SPATIAL WHITENING

(75) Inventors: Tzahi Weisman, Jerusalem (IL); Ayelet Doron, Modi'in (IL)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 13/175,055

(22) Filed: Jul. 1, 2011

(65) Prior Publication Data

US 2013/0003896 A1    Jan. 3, 2013

(51) Int. Cl.
    *H04L 27/06* (2006.01)
(52) U.S. Cl.
    USPC .......................................... 375/340; 375/267
(58) Field of Classification Search
    USPC .................................. 375/267, 340
    See application file for complete search history.

(56) References Cited

U.S. PATENT DOCUMENTS

| | | | |
|---|---|---|---|
| 6,314,147 B1 * | 11/2001 | Liang et al. ................... | 375/346 |
| 8,233,926 B2 * | 7/2012 | Heath et al. ................... | 455/501 |
| 2004/0114695 A1 | 6/2004 | Astely et al. | |
| 2005/0101279 A1 | 5/2005 | Lee et al. | |
| 2008/0181342 A1 | 7/2008 | Cho et al. | |
| 2009/0304116 A1 | 12/2009 | Challa et al. | |
| 2010/0067366 A1 | 3/2010 | Nicoli | |
| 2010/0128827 A1 | 5/2010 | Lincoln et al. | |

FOREIGN PATENT DOCUMENTS

| | | |
|---|---|---|
| WO | 2013/006509 A2 | 1/2013 |
| WO | 2013/006509 A3 | 3/2013 |

OTHER PUBLICATIONS

Kohno, R. ; Ishii, N. ; Nagatsuka, M.; "A spatially and temporally optimal multi-user receiver using an array antenna for DS/CDMA," Sixth IEEE International Symposium on Personal, Indoor and Mobile Radio Communications, 1995. PIMRC'95. Wireless: Merging onto the Information Superhighway, vol. 3, 1995.*

Ishii, N. ; Kohno, R.; "Joint optimization of spatial and temporal multi-user equalization in both transmitter and receiver using adaptive array antennas for DS/CDMA," Global Telecommunications Conference, 1996. GLOBECOM '96. Communications: The Key to Global Prosperity, 1996 , pp. 137-141.*

International Search Report and Written Opinion received for PCT application No. PCT/US2012/045152, mailed on Feb. 1, 2013, 10 pages.

International Preliminary Report on Patentability/with Written Opinion received for P.C.T Patent Application No. PCT/US2012/045152 , mailed on Jan. 16, 2014. 7 pages.

* cited by examiner

*Primary Examiner* — Shuwang Liu
*Assistant Examiner* — Nader Bolourchi
(74) *Attorney, Agent, or Firm* — Thorpe North & Western, LLP

(57) ABSTRACT

A system and method for decoding a Multi User (MU) Multiple Input Multiple Output (MIMO) signal is disclosed. The method comprises receiving a selected symbol in a tone of an MU-MIMO signal at a mobile communication device. A channel response for the selected symbol is identified. Spatial whitening is applied to the tone and the channel response using an average of a co-user interference plus noise matrix that is averaged over a selected number of tones. Maximal ratio combining is performed for the spatially whitened tone and the spatially whitened channel response matrix to decode the selected symbol out of the spatially whitened tone.

20 Claims, 7 Drawing Sheets

US 8,711,985 B2

MULTI USER MIMO DETECTION UTILIZING AVERAGED SPATIAL WHITENING

BACKGROUND

The increased processing power in mobile computing devices such as tablet computers and wireless phones has allowed the devices to be used to play audio, display multimedia, and act as a gaming platform for games of increasing complexity. These uses have also increased the need for increased communication bandwidth to transmit multimedia, download programs, and stream media from desired sources. However, the increased need for bandwidth comes at a time when substantial new bandwidth is not available. Moreover, the increased processing needs often reduces the power that is available for the communication of data, thereby making it important to minimize the use of power while maximizing the amount of data that can be transmitted in a set amount of bandwidth.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The increasing use of multi-media and streaming in wireless devices has amplified the demand for bandwidth. One means for increasing bandwidth is through the use of multiple transmit antennas and/or multiple receive antennas for transmitting a signal. The use of multiple transmit and/or receive antennas offers significant increases in data throughput and link range without the need for additional bandwidth or transmit power. The increased data throughput can be achieved through higher spectral efficiency and link reliability obtained through antenna diversity.

Figure 1A:
FIG. 1a illustrates a block diagram of a single-input single-output (SISO) wireless network in accordance with an example.
Figure 1B:
FIG. 1b illustrates a block diagram of a single-input multiple-output (SIMO) wireless network in accordance with an example.
Figure 1C:
FIG. 1c illustrates a block diagram of a multiple-input single-output (MISO) wireless network in accordance with an example.
Figure 1D:
FIG. 1d illustrates a block diagram of a multiple-input multiple-output (MIMO) wireless network in accordance with an example.

FIG. 1A illustrates a mobile communication system using a single radio channel on a transmitting antenna port 110 and a single radio channel on a receiving antenna port 130, which can be called a single-input single-output (SISO) wireless network. FIG. 1B illustrates a wireless communication system using a single radio channel 110 on a transmitting antenna port and multiple radio channels on a number of receiving antenna ports 140, which can be called a single-input multiple-output (SIMO) wireless network. FIG. 1C illustrates a wireless communication system using multiple radio channels on a number of transmitting antenna ports 120 and a single radio channel on a receiving antenna port 130, which can be called a single-input multiple-output (SIMO) wireless network. FIG. 1D illustrates a wireless communication system using multiple radio channels on a number of transmitting antenna ports 120 and multiple radio channels on a number of receiving antenna ports 140, which can be called a multiple-input multiple-output (MIMO) wireless network. The terms input and output typically refers to the radio channel carrying the signal, and not to the devices having antennas.

Single User (SU)-MIMO can be configured with two or more transmit antennas in a downlink, which supports the transmission of multiple spatial layers, with up to four layers accessible by a selected mobile communication device. The mobile communication device is referred to by different names, including User Equipment (UE) in the Third Generation Partnership Project (3GPP) and Subscriber Unit (SU) in the Institute of Electrical and Electronics Engineers (IEEE) 802.16 standard, which is commonly referred to as Wimax. SU-MIMO typically only involves access to the multiple antennas that are physically connected to each mobile communication device.

Multi User (MU)-MIMO can utilize the accessibility of multiple independent mobile communication devices to enhance the communication capabilities of each individual device. MU-MIMO involves the use of Space-Division Multiple Access (SDMA) which enables a terminal to transmit (or receive) a signal to/from multiple users in the same frequency band simultaneously. Beamforming allows multiple signals transmitted by different antennas add up constructively to increase the amplitude of the received signal. In addition, the effects of multi-path fading can be reduced since each of the multiple signals that are transmitted typically travel over a different path, thereby each undergoing different fading effects. SDMA can be accomplished through the use of precoding at the transmitter.

Precoding is a generalization of beam forming to allow multi-layer transmission in MIMO communications. In single-layer beam forming, the same signal is emitted from each of the transmit antennas with selected weighting so that the signal power is maximized at the receiver output. When the receiver has multiple antennas, such as receiver 140 in FIGS. 1b and 1d, single-layer beam forming cannot simultaneously maximize the signal level at all of the receive antennas. In order to maximize the throughput in the plurality of receive antennas, multi-layer beam forming can be used.

In SU-MIMO, precoding involves emitting multiple data streams from the transmit antennas with selected weighting so that the link throughput is maximized at the receiver output. In MU-MIMO, the data streams may be intended for different users. A multi-antenna transmitter 120 can communicate simultaneously with multiple receivers 130, 140 that each has single or multiple antennas.

Spatial multiplexing in a MIMO system involves splitting a high rate data stream can be split into multiple lower rate data streams. Each of the lower rate data streams can then be transmitted from a different transmit antenna in the same frequency channel at the same time. If the signals arrive at the receiver array with sufficiently different spatial signatures, the receiver can separate these streams into substantially parallel channels. The simultaneous transmission to a plurality of receivers using spatial multiplexing is synonymous with SDMA.

Precoding and decoding algorithms for SDMA systems may involve the use of linear and nonlinear precoding algorithms. Nonlinear algorithms can achieve the highest transmission capacities compared with linear precoding approaches. However, nonlinear algorithms typically have significantly increased complexity compared with linear approaches, thereby necessitating increased processing power, memory requirements, and power use at the mobile communication device.

Figure 2:
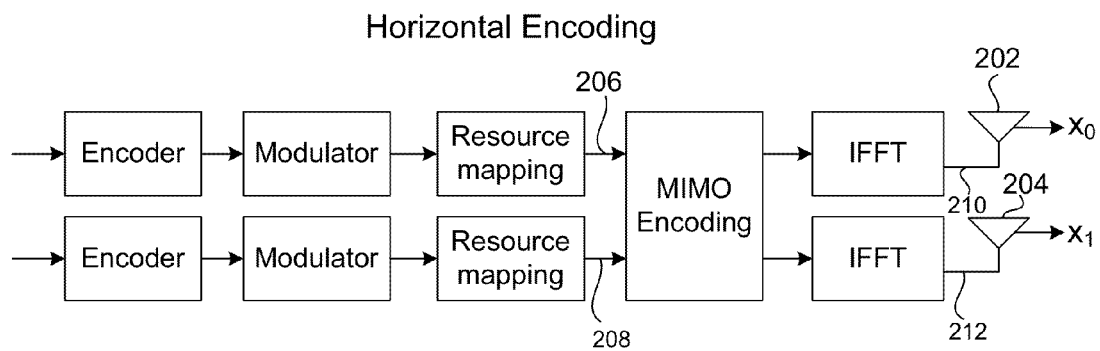
FIG. 2 illustrates a block diagram of a horizontal encoding scheme for multi-user (MU) MIMO in accordance with an example.

FIG. 2 provides an example block diagram for a horizontal encoding scheme for baseband signal generation in an MU-MIMO system. For each transmit antenna 202, 204 an OFDM signal is separately encoded, modulated and mapped. Each codeword can be intended for reception by a different user. The mapped signals 206, 208 are then sent for MIMO encoding, followed by performing separate inverse fast Fourier transforms on the signal prior to transmitting the separate signals 210, 212 at each antenna 202 204. Each transmitted signal $x_0, x_1, \ldots x_n$ includes multiple data streams transmitted in the same time and frequency. The value n is a positive integer. The MIMO encoding can use an encoding scheme, such as the use of Space Time Block Codes (STBC) or another encoding scheme to encode each stream in a manner that enables a selected stream to be decoded at a receiver.

Figure 3:
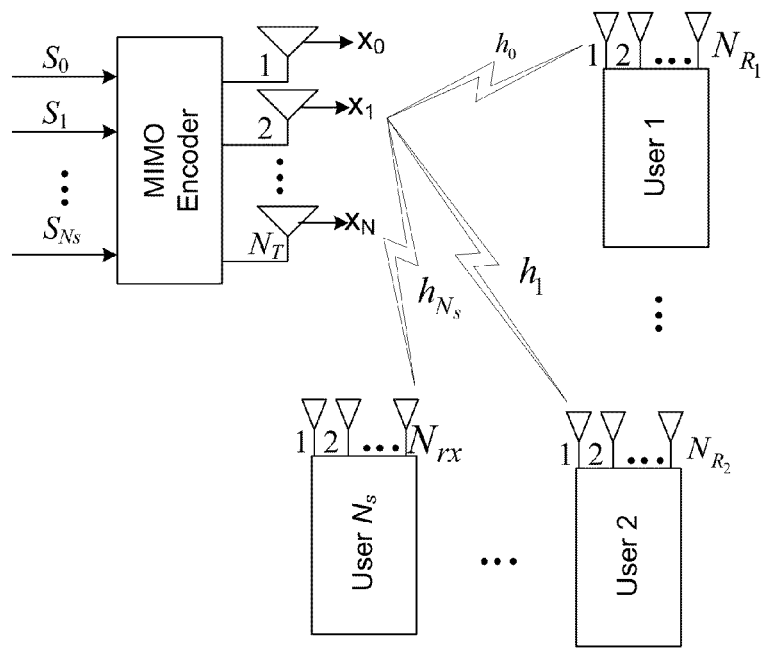
FIG. 3 illustrates a block diagram of an MU-MIMO communication scheme in accordance with an example.

FIG. 3 provides a more general example of a plurality of data streams $S_0, S_1, \ldots S_{Ns}$ encoded in a MIMO encoder and transmitted via the $N_T$ transmit antennas to $N_s$ users. While the number of data streams is set equal to the number of users in this example, this is not a necessity. The number of data streams (S) may be less than or greater than the number of users ($N_S$). Each user can have $N_r$ antennas on the user's mobile communication device. The data streams are transmitted over a channel H. Some users may have more antennas than other users. The number of antennas at each user's mobile communication device is typically greater than one for an MU-MIMO system, though in some situations a mobile communication device may have a single antenna, with the concept of multiple input being derived from multiple users each having a single antenna communication device. The number of user antennas $N_r$ is typically greater than or equal to the number of streams $S_{Ns}$ to allow decoding. The number of antennas at a base station (eNode B) is also typically greater than one to enable decoding of an MU-MIMO signal transmitted by a plurality of mobile communication devices.

In one embodiment, a total of $N_s$ users can share the same OFDM tone. A single received tone, y, in $N_{rx}$ antennas at a mobile communication device, where $N_r$ is the number of receive antennas (wherein N a positive integer), and x is the number of users in an MU-MIMO system, is given by:

$$y=Hs+n=h_0s_0+H_rs_r+n,$$

where $s=[s_0, s_1, \ldots, s_{N_S-1}]^T$ is a transmitted Quadrature Amplitude Modulated (QAM) symbols vector with $s_0$ being the stream of interest (without losing generality), T represents a transposed matrix, and $s_r=[s_1, \ldots, s_{N_S-1}]^T$ is the co-users interference vector. H is the channel response matrix, with $h_0$ the channel response for $s_0$, $H_r$ is the channel response matrix for $s_r$, with $H=[h_0H_r]$. The noise at the receiver is represented by n. Any type of M-ary QAM symbols can be used, such as M=2, 4, 8, 16, 32, 64, 128, 256, 512, and so forth.

The total noise at the receiver plus the noise caused by the interference of the co-users is then $v=H_rs_r+n$. The autocorrelation of the total noise v is $R_{vv}=E\{bb^H\}=H_rH_r^H+R_{nn}$, wherein the superscript H represents the Hermetian transpose and $R_{nn}$ is the autocorrelation of the noise n at the receiver. It should be noted that the number of co-users, $N_S-1$, can be larger than the number of receiving antennas $N_{rx}$. Typically, only the constellation of the stream to be decoded, $s_0$, is known to the receiver.

From the point of view at the receiver, the MU-MIMO can be regarded as a single stream transmission (SIMO scheme) since only one of the spatially multiplexed streams is to be decoded. The remaining $N_S-1$ streams are considered as noise. Each receiver may be assigned to receive data at a selected symbol in the received tone y. In the example above, the symbol in each tone that is received is selected as $s_0$.

However, the receiver may be configured to receive any of the $s_{N_S-1}$ symbols in the received tone. The receiver can receive a plurality of tones and decode the selected symbol in each tone to form a stream of symbols. Thus, the symbol index may be referred to as a "stream", referring to the symbol index that is received from each tone transmitted to the mobile communication device in the MU-MIMO system.

Generally, the objective at the transmitter is to minimize the interference contributed by the $N_S-1$ co-users for each of the multiplexed users, while maximizing the intended stream's Signal to Noise Ratio (SNR) using spatial precoding.

In one embodiment, the receiver for each user can be a Maximal Ratio Combining (MRC) type receiver. MRC is a method of diversity combining in which (a) the streams from each channel are added together; (b) the gain of each stream is made proportional to the Root Mean Square (RMS) signal level and inversely proportional to the mean square noise level in that stream; and (c) different proportionality constants are used for each stream.

The MRC receiver can be used to equalize the relevant stream and substantially ignore the interference caused by the co-users (i.e. the remaining streams $s_1 \ldots s_{N_S-1}$ in the received tone y. In some designs, spatial whitening may be used prior to an MRC equalization to mitigate platform noise using some estimated noise statistics. The estimated noise statistics of noise at a receiver is represented by the variable $\hat{R}_{nn}$.

In many cases the noise is correlated between the multiple receive antennas and may be de-correlated (whitened) prior to equalization in order to enhance demodulation performance. A spatial whitening module can be applied to correlated signals. The module can manipulate the signals such that the output vector can be shown to be substantially "white", thereby resulting in spatially uncorrelated noise vectors. Spatially de-correlating the received signal can substantially increase the ability to decode the signal at the receiver.

Figure 4:
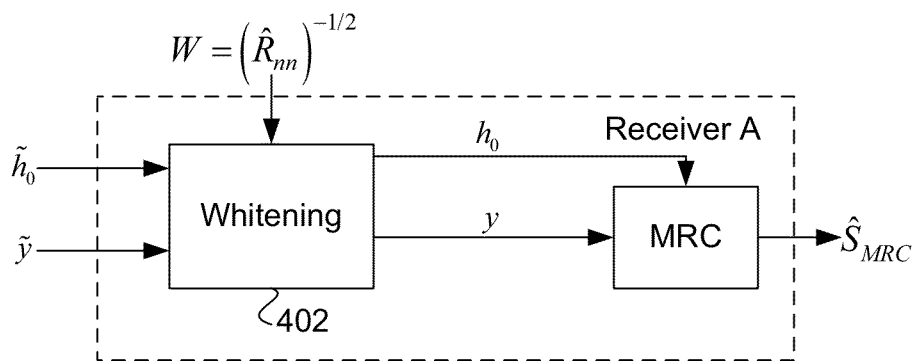
FIG. 4 illustrates a block diagram of an MRC receiver for MU-MIMO in accordance with an example.

In one example illustrated in FIG. 4, a received signal vector $\tilde{y}$ is input into a spatial whitening module 402 along with $\tilde{h}_0$, representing the portion of the channel response matrix for the stream $s_0$ that is to be detected at a mobile communication device. The received signal vector $\tilde{y}$ and the channel response matrix $\tilde{h}_0$ for stream $s_0$ are multiplied by a whitening matrix that is derived using the estimated noise statistics at the receiver, $\hat{R}_{nn}$. The post-processed outputs $h_0$ and y have substantially uncorrelated noise, enabling enhanced detection and decoding of the received signal y at the MRC receiver. The whitening module employing the estimated noise statistics of the receiver combined with the MRC receiver is referred to as Receiver A. The output of Receiver A is the data stream designated $\hat{S}_{OMRC}$. The MRC receiver performs the function given by:

$$\hat{S}_{MRC} = \frac{h_0^H y}{h_0^H h_0}.$$

Figure 5:
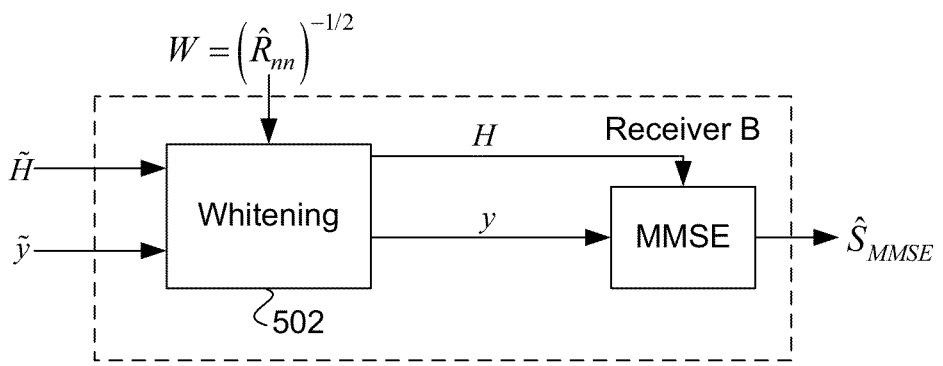
FIG. 5 illustrates a block diagram of an MMSE receiver for MU-MIMO in accordance with an example.
Figure 6:
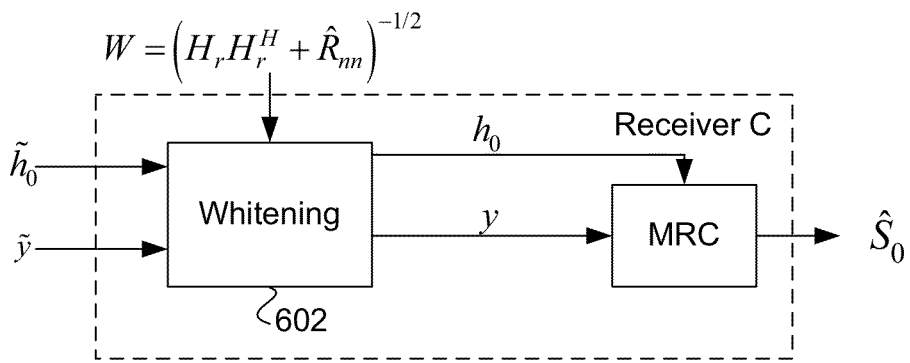
FIG. 6 illustrates a block diagram of an MRC receiver using a noise plus co-user interference matrix to whiten tones in accordance with an example.

It should be noted that in the examples illustrated in FIGS. 4-6, the use of a tilda ($\sim$) over a variable is used to represent a pre-processed value. The output of a pre-processed value is typically illustrated without a tilda, thereby representing a post-processed value. The symbol "^" over a variable represents an estimate of a parameter.

Practical limitations such as limited feedback (in closed-loop systems), channel dynamics, and a limited number of subscribers that reduce the effectiveness of the transmitter's precoding, result in considerable co-user interference. Consequently, the MRC receiver used in Receiver A can suffer from a considerable performance loss since the co-user interference is not taken into account.

In practical systems, the channel response matrix of the co-users, $H_r$, can be estimated using designated transmitted pilots, such as the reference signals in the 3GPP specification or other types of pilots transmitted in an OFDM system. The co-user channel response matrix can be exploited to enhance the post equalization Signal to Noise Ratio (SNR) using Minimal Mean Square Error (MMSE) equalization. For instance, $\hat{s}_{MMSE} = c^H y$, where $c^H$ is the relevant row from an MMSE matrix defined by:

$$H^H(HH^H + R_{nn})^{-1},$$

where H is the channel response matrix, superscript H is a Hermetian transpose, and $R_{nn}$ is the noise correlation matrix.

FIG. 5 illustrates an example of using an MMSE module in conjunction with a spatial whitening module 502. The channel response matrix H and received signal $\tilde{y}$ are multiplied by a constant that is proportional to the estimated noise statistics at the receiver, $\hat{R}_{nn}$. The outputs H and y represent vectors having substantially uncorrelated noise, enabling enhanced detection of the selected symbol in the received tone y at the MMSE module. The whitening module employing the estimated noise statistics of the receiver combined with the MMSE module used to perform MMSE equalization is referred to as Receiver B.

The potential solution illustrated in the example of FIG. 5 can be viewed as optimal from the mean square error sense. However, the MMSE equalization can be very hardware demanding since an inversion of a matrix is performed for each of the received tones (i.e. for each stream $s_{N_S-1}$). Accordingly, the use of Receiver B may not be optimal when hardware and power limitations are present in mobile communication devices.

In accordance with one embodiment of the present invention, spatial whitening using the total noise statistics $R_{vv} = H_r H_r^H + \hat{R}_{nn}$, which also includes the co-user interference, can be used in conjunction with an MRC operation (i.e. an MRC receiver) to achieve a similar result as the more hardware intensive operation of MMSE equalization, as displayed in FIG. 5.

For example, FIG. 6 illustrates Receiver C, wherein an MRC receiver is used in conjunction with a spatial whitening module 602. Both the estimated receiver noise $\hat{R}_{nn}$ and the co-user interference $H_r H_r^H$ are taken into account in the spatial whitening module. A pre-processed received signal $\tilde{y}$ is input into the spatial whitening module 602 along with $\tilde{h}_0$, representing the portion of the channel response matrix for the stream $s_0$ in the symbols vector s that is to be detected and decoded at a mobile communication device. The received signal vector $\tilde{y}$ and the channel response matrix $\tilde{h}_0$ for stream $s_0$ are multiplied by a matrix that is proportional to the estimated noise statistics of noise at the receiver, $\hat{R}_{nn}$ plus the co-user interference $H_r H_r^H$. The proportionality in this example is one over the square root of the noise plus co-user interference, $$\frac{1}{\sqrt{R_{vv}}}.$$

The outputs $h_0$ and y represent post-processed signals that have been spatially whitened to provide substantially uncorrelated noise, enabling enhanced detection and decoding of the stream $s_0$ in the received signal y at the MRC receiver. The output of Receiver C is the data stream designated $\hat{S}_0$, where the MRC operation is given by:

$$\hat{S}_0 = \frac{h_0^H y}{h_0^H h_0},$$

where $h_0$ is the channel response matrix for the portion of each tone that is related to the selected symbol ($s_0$), superscript H is a Hermetian transpose, and y is the received tone.

Figure 7:
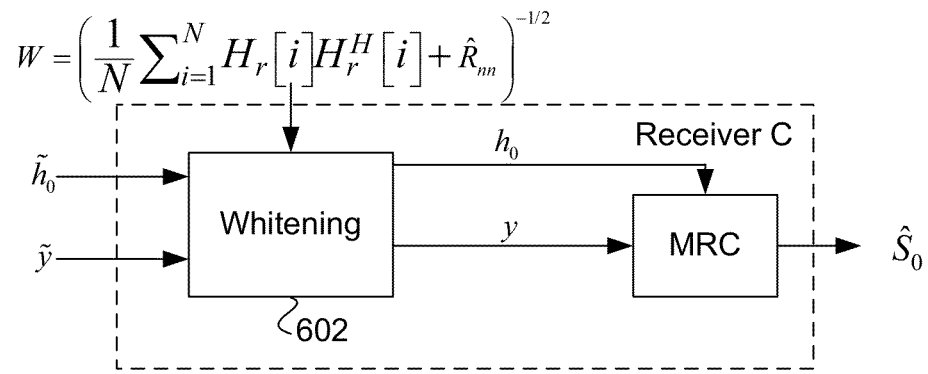
FIG. 7 illustrates a block diagram of the MRC receiver using an average noise plus co-user interference matrix to whiten tones in accordance with an example.

In Receiver B the matrix inversion of the total noise statistics $R_{vv}$ is performed inside the MMSE equalizer module. Whereas Receiver C is configured to invert the matrix of the total noise statistics $R_{vv}$ inside the whitening module 602. The complexity of performing the inversion in the MMSE module can be reduced in Receiver C by a factor of N by using a single average of the co-user interference plus noise matrix, $\overline{R}_{vv}$, to whiten N tones. The average noise matrix is given by:

$$\overline{R}_{vv} = \frac{1}{N}\sum_{i=1}^{N} H_r[i]H_r^H[i] + \hat{R}_{nn},$$

where N is the number of tones (i.e. streams), $H_r$ is the channel response matrix for $s_r$, superscript H is the Hermetian transpose, and $\hat{R}_{nn}$ is the noise correlation matrix. The number of smoothed tones N trades off between computation load and performance. When N=1, the computation load and performance is similar to an MMSE receiver, such as FIG. 5. However, for larger numbers of N, such as N=18 as an example, implementation is significantly simplified but performance can consequently degrade. FIG. 7 provides an example illustration of the use of Receiver C with an average of the co-user interference plus noise matrix, $\overline{R}_{vv}$, used at the whitening module 602.

The computation of the average estimated co-users interference plus noise matrix $\overline{R}_{vv}$ can further be simplified for small values of N, such as 4 to 8 smoothed tones, by initially computing the average co-user channel response matrix, given by:

$$\overline{H}_r = \frac{1}{N}\sum_{i=1}^{N} H_r[i].$$

Once the average co-user channel response matrix has been computed, the average noise matrix, given by:

$$\check{R}_{vv} = \overline{H}_r\overline{H}_r^H + \hat{R}_{nn},$$

can then be computed. This average noise matrix can be used for each tone in Receiver C in the whitening module 602.

Thus, taking the average co-users' interference into account in the spatial whitening module in the detection process can significantly increase the ability to detect the desired data stream $s_0$ at the receiver while enabling the overall complexity of the detection process to be reduced for values of N greater than 1.

While several examples have been provided for detecting a single data stream $s_0$ in the MU-MIMO signal, the present invention is not limited to the detection of a single stream. A maximal likelihood detector (MLD) can be used, in conjunction with the average co-user channel response matrix and the average noise matrix, to detect multiple streams simultaneously, as can be appreciated.

Figure 8:
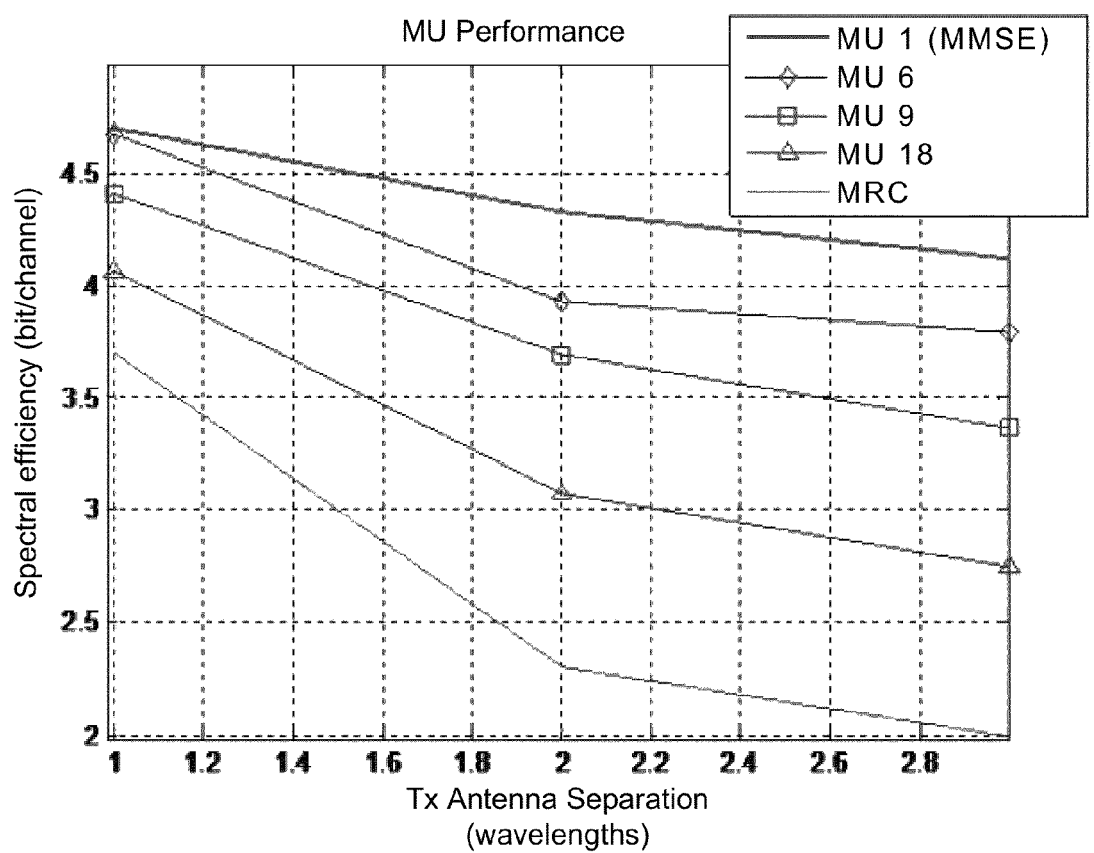
FIG. 8 is a graph showing spectral efficiency of receivers depicted in FIGS. 4-6 in accordance with an example.

FIG. 8 provides a simulation used to evaluate the performance of the average co-user channel response matrix and average noise matrix in detecting a data stream $s_0$. In the simulation, a simplified closed loop MU-MIMO scheme was employed. In the scheme, the transmitter searches the best (capacity based metric) frequency band (containing 18 tones) to transmit an MU-MIMO signal to User 0 using a predefined codebook. A perfect knowledge of the channel is assumed.

Spectral efficiency is evaluated as a function of the transmitter's antenna separation (in wavelengths). This, in turn, determines the channel spatial correlation. The algorithm is termed "WLS N", where WLS is weighted least squares and N is the number of tones sharing the same co-users interference whitening matrix. The figure compares the spectral efficiency for N=1, 6, 9, and 18 for a fading channel. When N=1 it is equivalent to the use of an MMSE detector, as previously discussed. The spectral efficiency of an MRC receiver (FIG. 4) is also plotted. As can be seen, the spectral efficiency for N=9 decreases, relative to the MMSE detector, from approximately 4.3 bits/channel to 3.9 bits/channel, resulting in a decreased spectral efficiency of approximately 10%. However, the complexity is decreased by a factor of 9. Thus, the use of the average co-users interference matrix provides a significant decrease in complexity while resulting in relatively small decreases in spectral efficiency relative to an MMSE receiver. In addition, the use of the average co-users interference matrix provides a significant improvement in spectral efficiency over a traditional MRC receiver. Even an N=18, the spectral efficiency is 3.1, a 35% increase over the spectral efficiency of the MRC receiver at 2.3 bits/channel.

While the simulation was performed for a closed loop MU-MIMO scheme, the average noise plus co-user interference matrix $\overline{R}_{vv}$ can also be applied in an open loop MU-MIMO scheme as well.

Figure 9:
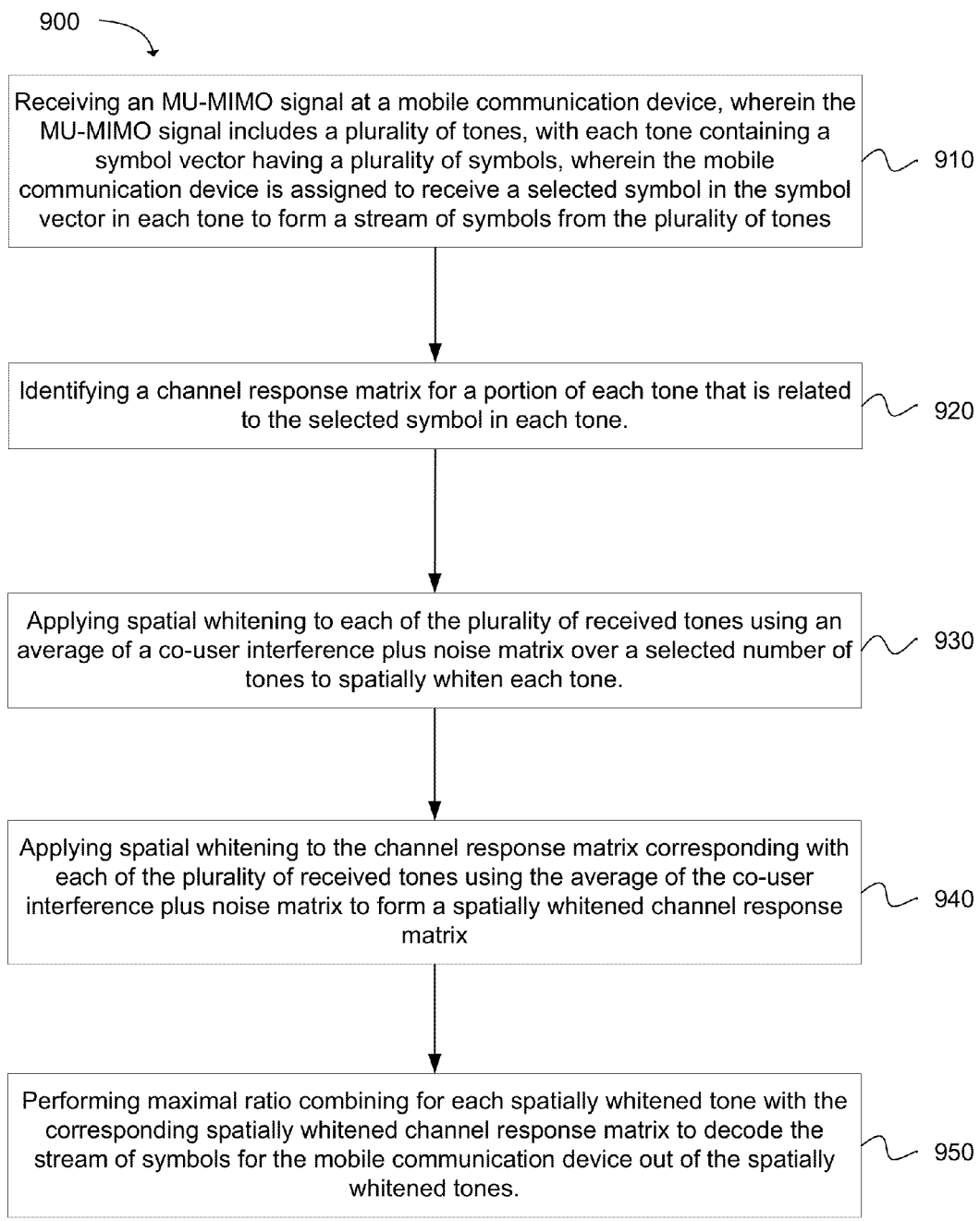
FIG. 9 depicts a flow chart of a method for decoding a Multi User (MU) Multiple Input Multiple Output (MIMO) signal in accordance with an example.

In accordance with one embodiment of the present invention, a method 900 for decoding a Multi User (MU) Multiple Input Multiple Output (MIMO) signal is disclosed, as depicted in the flow chart of FIG. 9. The method comprises receiving 910 the MU-MIMO signal at a mobile communication device. The MU-MIMO signal includes a plurality of tones. Each tone contains a symbol vector having a plurality of symbols. For example, as previously discussed, the symbol vector may be represented by $s=[s_0, s_1, \ldots, s_{N_s-1}]^T$, where $N_s$ is the number of users in the MU-MIMO system. The mobile communication device can be assigned to receive a selected symbol in the symbol vector s. In the examples previously provided, the symbol $s_0$ is selected. In each received tone, the mobile communication device attempts to decode the symbol $s_0$ to form a stream of symbols in the $s_0$ position. While the $s_0$ symbol is provided as an example, the mobile communication device may be assigned to receive any of the $s_{N_s-1}$ symbols.

The method 900 further comprises identifying 920 a channel response matrix for a portion of each tone that is associated with the selected symbol in each tone. For example, a channel response $h_0$ may be identified that is associated with the selected symbol $s_0$. A separate channel response can be identified for each tone received at the mobile communication device.

An additional operation involves applying 930, 940 spatial whitening to each of the plurality of received tones and the channel response matrix corresponding with each of the received tones. The spatial whitening is applied using an average of a co-user interference plus noise matrix, such as $\overline{R}_{vv}$, that is averaged over a selected number of tones to form a plurality of spatially whitened tones and a spatially whitened channel response matrix for each of the spatially whitened tones. Thus, for each received tone, spatial whitening is applied to the received tone and the corresponding channel response matrix using the average co-user interference plus noise matrix. One example of applying the average co-user interference plus noise matrix is illustrated in FIG. 7.

The method 900 further comprises performing 950 maximal ratio combining for each spatially whitened tone with the corresponding spatially whitened channel response matrix to decode the stream of symbols for the mobile communication device out of the spatially whitened tones. The selected symbol $\hat{S}_0$ in each tone can be estimated using maximal ratio combining, given by:

$$\hat{S}_0 = \frac{h_0^H y}{h_0^H h_0},$$

where $h_0$ is the channel response matrix for the portion of each tone that is related to the selected symbol, superscript H is a Hermetian transpose, and y is the received tone.

Figure 10:
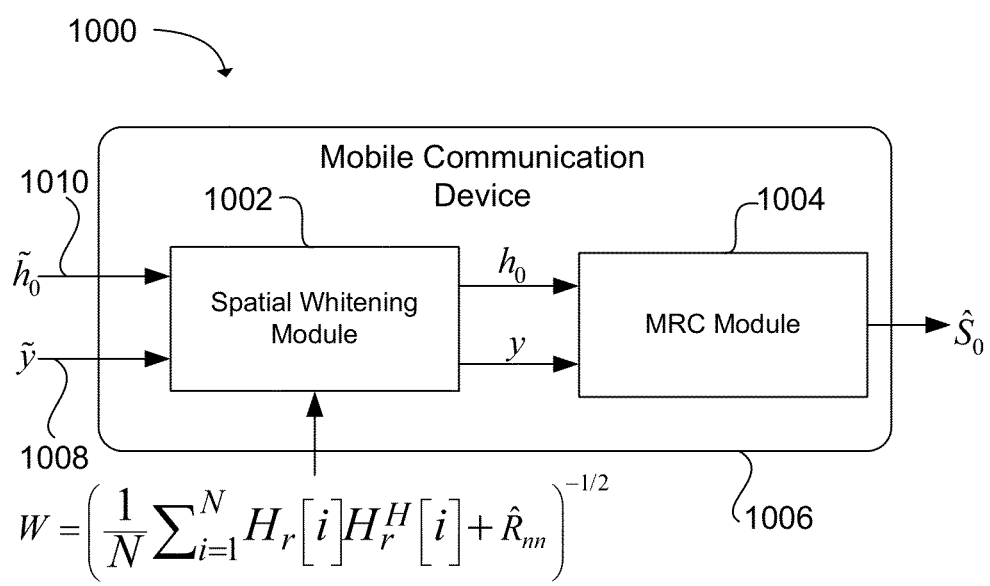
FIG. 10 depicts block diagram a system for decoding a Multi User (MU) Multiple Input Multiple Output (MIMO) signal in accordance with an example.

In another embodiment, a spatial whitening system for an MU-MIMO device is disclosed. FIG. 10 illustrates one example system 1000. The system is comprised of a spatial whitening module 1002 coupled to a mobile communication device 1006. The mobile communication device can be any type of wireless device configured to communicate using OFDM.

The spatial whitening module 1002 is configured to receive an MU-MIMO signal 1008 having a plurality of tones. Each tone can contain a symbol vector having a plurality of symbols, as previously discussed. The mobile communication device is configured to receive a selected symbol in the symbol vector in each tone to form a stream of symbols from the plurality of tones. For instance, each received tone can include symbols represented by the symbol vector $s=[s_0, s_1, \ldots, s_{N_S-1}]^T$. The mobile communication device may be configured to detect the $s_0$ symbol in each tone to form the stream of symbols.

The spatial whitening module 1002 is further configured to receive a channel response matrix 1010 for a portion of each tone that is associated with the selected symbol in each tone. For instance, as shown in the example of FIG. 10, the channel response matrix can be $\tilde{h}_0$, which is associated with the selected symbol $s_0$.

The spatial whitening module 1002 is further configured to apply spatial whitening to each of the plurality of received tones and to the channel response matrix corresponding with each tone using a co-user interference plus noise matrix that is averaged over a selected number of tones. An average co-user interference plus noise matrix, such as $\overline{R}_{vv}$ can be used to spatially whiten each tone and each corresponding channel response matrix.

For example, FIG. 10 illustrates that the average noise matrix $$\frac{1}{\sqrt{\overline{R}_{vv}}}$$

is used to perform spatial whitening on the tone $\tilde{y}$ and the channel response matrix $\tilde{h}_0$, which is associated with the selected symbol $s_0$. The output of the spatial whitening module is the spatially whitened tone y and the spatially whitened channel response matrix $h_0$. These values are then input into the MRC module 1004.

The MRC module 1004 is configured to perform maximal ratio combining for each spatially whitened tone with the corresponding spatially whitened channel response matrix to decode the stream of symbols for the mobile communication device out of the spatially whitened tones. For example, the selected symbol $\hat{S}_0$ in each tone can be estimated using maximal ratio combining, given by:

$$\hat{S}_0 = \frac{h_0^H y}{h_0^H h_0},$$

where $h_0$ is the channel response matrix for the portion of each tone that is related to the selected symbol, superscript H is a Hermetian transpose, and y is the whitened tone. The selected symbol in each tone can be estimated in a similar fashion to enable the stream of symbols to be detected in the plurality of received tones.

The system 1000 may be implemented in software, firmware, hardware, or some combination of these. For example, the system 1000 may be implemented on a processor connected to a digital memory located in the mobile communication device 1006.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for decoding a Multi User (MU) Multiple Input Multiple Output (MIMO) signal, comprising:
    receiving an MU-MIMO signal at a mobile communication device, wherein the MU-MIMO signal includes a plurality of tones, with each tone containing a symbol vector having a plurality of symbols, wherein the mobile communication device is assigned to receive a selected symbol in the symbol vector in each tone to form a stream of symbols from the plurality of tones;
    identifying a channel response matrix for a portion of each tone that is related to the selected symbol in each tone;
    applying spatial whitening to each of the plurality of tones using an average of a co-user interference plus noise matrix over a selected number of tones to spatially whiten each tone;
    applying spatial whitening to the channel response matrix corresponding with each of the plurality of tones using the average of the co-user interference plus noise matrix to form a spatially whitened channel response matrix; and
    performing maximal ratio combining for each spatially whitened tone with the corresponding spatially whitened channel response matrix to decode the stream of symbols for the mobile communication device out of the spatially whitened tones.

2. The method of claim 1, wherein applying spatial whitening to each of the plurality of tones and the channel response matrix further comprises determining an average noise matrix $\overline{R}_{vv}$, given by:

$$\overline{R}_{vv} = \frac{1}{N} \sum_{i=1}^{N} H_r[i] H_r^H[i] + \hat{R}_{nn},$$

where N is a selected number of tones in the MU-MIMO signal over which to average, $H_r$ is a channel response matrix for each symbol in the symbol vector other than the selected symbol, superscript H is a Hermetian transpose, and $\hat{R}_{nn}$ is an estimation of noise in a receiver of the mobile communication device.

3. The method of claim 1, further comprising estimating the selected symbol $\hat{S}_0$ in each tone using maximal ratio combining, given by:

$$\hat{S}_0 = \frac{h_0^H y}{h_0^H h_0},$$

where $h_0$ is the channel response matrix for the portion of each tone that is related to the selected symbol, superscript H is a Hermetian transpose, and y is the received tone.

4. The method of claim 1, wherein applying the spatial whitening using the average of the co-user interference plus noise matrix further comprises applying an estimated average co-user interference matrix $\overline{H}_r$, given by:

$$\overline{H}_r = \frac{1}{N} \sum_{i=1}^{N} H_r[i]$$

where N is a selected number of tones in the MU-MIMO signal over which to average, and $H_r$ is a channel response matrix corresponding to streams of co-users.

5. The method of claim 4, further comprising calculating an average noise matrix using the estimated average co-user interference matrix, wherein the average noise matrix $\check{R}_{vv}$, is given by:

$$\check{R}_{vv} = \overline{H}_r \overline{H}_r^H + \hat{R}_{nn}$$

where superscript H is a Hermetian transpose, and $\hat{R}_{nn}$ is an estimation of noise in a receiver of the mobile communication device.

6. The method of claim 1, further comprising decoding at least two selected symbols in each of the plurality of tones.

7. The method of claim 6, further comprising decoding at least two selected symbols in each of the plurality of tones using a maximal likelihood detector.

8. The method of claim 1, further comprising applying spatial whitening to each of the plurality of tones and the corresponding channel response matrix using the average of the co-user interference plus noise matrix, wherein the co-user interference plus noise matrix is averaged over a length selected from two tones to 36 tones.

9. A spatial whitening system for a Multi User (MU) Multiple Input Multiple Output (MIMO) device comprising:
a spatial whitening module coupled to a mobile communication device, wherein the spatial whitening module is configured to:
receive an MU-MIMO signal having a plurality of tones, with each tone containing a symbol vector having a plurality of symbols, wherein the mobile communication device is configured to receive a selected symbol in the symbol vector in each tone to form a stream of symbols from the plurality of tones;
receive a channel response matrix for a portion of each tone that is associated with the selected symbol in each tone; and
apply spatial whitening to each of the plurality of tones and to the channel response matrix corresponding with each tone using a co-user interference plus noise matrix averaged over a selected number of tones to spatially whiten each tone and each corresponding channel response matrix; and
an MRC module configured to perform maximal ratio combining for each spatially whitened tone with the corresponding spatially whitened channel response matrix to decode the stream of symbols for the mobile communication device out of the spatially whitened tones.

10. The system of claim 9, wherein the spatial whitening module is configured to apply spatial whitening to each of the plurality of tones and the channel response matrix using an average noise matrix $\overline{R}_{vv}$, given by:

$$\overline{R}_{vv} = \frac{1}{N}\sum_{i=1}^{N} H_r[i]H_r^H[i] + \hat{R}_{nn},$$

where N is a selected number of tones in the MU-MIMO signal over which to average, $H_r$ is a channel response matrix for each symbol in the symbol vector other than the selected symbol, superscript H is a Hermetian transpose, and $\hat{R}_{nn}$ is an estimation of noise in a receiver of the mobile communication device.

11. The system of claim 9, wherein the MRC module is configured to estimate the selected symbol $\hat{S}_0$ in each of the plurality of tones using maximal ratio combining, given by:

$$\hat{S}_0 = \frac{h_0^H y}{h_0^H h_0},$$

where $h_0$ is the channel response matrix for the portion of each tone that is related to the selected symbol, superscript H is a Hermetian transpose, and y is the received tone.

12. The system of claim 9, wherein the spatial whitening module is further configured to apply the spatial whitening by applying an estimated average co-user interference matrix $\overline{H}_r$, given by:

$$\overline{H}_r = \frac{1}{N}\sum_{i=1}^{N} H_r[i]$$

where N is a selected number of tones in the MU-MIMO signal over which to average, and $H_r$ is a channel response matrix corresponding to streams of co-users.

13. The system of claim 12, wherein the spatial whitening module is further configured to calculate an average noise matrix using the estimated average co-user interference matrix, wherein the average noise matrix $\check{R}_{vv}$, is given by:

$$\check{R}_{vv} = \overline{H}_r \overline{H}_r^H + \hat{R}_{nn}$$

where superscript H is a Hermetian transpose, and $\hat{R}_{nn}$ is an estimation of noise in a receiver of the mobile communication device.

14. The system of claim 9, wherein the whitening module and the MRC module are configured to decode at least two selected symbols in each of the plurality of tones.

15. A computer program product, comprising a non-transitory computer readable medium having a computer readable program code embodied therein, the computer readable program code adapted to be executed to implement a method for detecting a Multi User (MU) Multiple Input Multiple Output (MIMO) signal, comprising:
receiving an MU-MIMO signal at a mobile communication device, wherein the MU-MIMO signal includes a plurality of tones, with each tone containing a symbol vector having a plurality of symbols, wherein the mobile communication device is assigned to receive a selected symbol in the symbol vector in each tone to form a stream of symbols from the plurality of tones;
identifying a channel response matrix for a portion of each tone that is related to the selected symbol in each tone;
applying spatial whitening to each of the plurality of received tones and the channel response matrix corresponding to each of the plurality of tones using an average of a co-user interference plus noise matrix that is averaged over a selected number of the plurality of tones to spatially whiten each tone and to form a spatially whitened channel response matrix corresponding to each spatially whitened tone; and
performing maximal ratio combining for each spatially whitened tone with the corresponding spatially whitened channel response matrix to decode the stream of symbols for the mobile communication device out of the spatially whitened tones.

16. The computer program product of claim 15, wherein applying spatial whitening to each of the plurality of tones and the channel response matrix further comprises determining an average noise matrix $\overline{R}_{vv}$, given by:

$$\overline{R}_{vv} = \frac{1}{N}\sum_{i=1}^{N} H_r[i]H_r^H[i] + \hat{R}_{nn},$$

where N is a selected number of tones in the MU-MIMO signal over which to average, $H_r$ is a channel response matrix for each symbol in the symbol vector other than the selected symbol, superscript H is a Hermetian transpose, and $\hat{R}_{nn}$ is an estimation of noise in a receiver of the mobile communication device.

17. The computer program product of claim 15, further comprising estimating the selected symbol $\hat{S}_0$ in each tone using maximal ratio combining, given by:

$$\hat{S}_0 = \frac{h_0^H y}{h_0^H h_0},$$

where $h_0$ is the channel response matrix for the portion of each tone that is related to the selected symbol, superscript H is a Hermetian transpose, and y is the received tone.

18. The computer program product of claim 15, wherein applying the spatial whitening using the average of the co-user interference plus noise matrix further comprises applying an estimated average co-user interference matrix $\overline{H}_r$ given by:

$$\overline{H}_r = \frac{1}{N}\sum_{i=1}^{N} H_r[i]$$

where N is a selected number of tones in the MU-MIMO signal over which to average, and $H_r$ is a channel response matrix corresponding to streams of co-users.

19. The computer program product of claim 18, further comprising calculating an average noise matrix using the estimated average co-user interference matrix, wherein the average noise matrix $\check{R}_{vv}$, is given by:

$$\check{R}_{vv} = \overline{H}_r \overline{H}_r^H + \hat{R}_{nn}$$

where superscript H is a Hermetian transpose, and $\hat{R}_{nn}$ is an estimation of noise in a receiver of the mobile communication device.

20. The method of claim 15, further comprising decoding at least two selected symbols in each of the plurality of tones.

* * * * *